United States Patent
Wang

(10) Patent No.: US 11,030,196 B2
(45) Date of Patent: Jun. 8, 2021

(54) METHOD AND APPARATUS FOR PROCESSING JOIN QUERY

(71) Applicant: HUAWEI TECHNOLOGIES CO., LTD., Guangdong (CN)

(72) Inventor: Zhenhua Wang, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 192 days.

(21) Appl. No.: 16/287,510

(22) Filed: Feb. 27, 2019

(65) Prior Publication Data

US 2019/0197040 A1 Jun. 27, 2019

Related U.S. Application Data

(63) Continuation of application No. PCT/CN2017/071568, filed on Jan. 18, 2017.

(30) Foreign Application Priority Data

Aug. 31, 2016 (CN) .......................... 201610797295.9

(51) Int. Cl.
  *G06F 7/00* (2006.01)
  *G06F 16/2453* (2019.01)
  (Continued)

(52) U.S. Cl.
  CPC .......... *G06F 16/24544* (2019.01); *G06F 7/36* (2013.01); *G06F 16/00* (2019.01);
  (Continued)

(58) Field of Classification Search
  CPC .............. G06F 16/24544; G06F 16/285; G06F 16/2255; G06F 16/2393; G06F 16/00; G06F 7/36
  (Continued)

(56) References Cited

U.S. PATENT DOCUMENTS

| 8,825,678 B2 | 9/2014 | Potapov et al. |
| 2005/0198019 A1* | 9/2005 | Cunningham .... G06F 16/24535 |

(Continued)

FOREIGN PATENT DOCUMENTS

| CN | 102323947 A | 1/2012 |
| CN | 102426609 A | 4/2012 |

(Continued)

OTHER PUBLICATIONS

Kamel Aouiche et al. Automatic Selection of Bitmap Join Indexes in Data Warehouses, DaWaK 2005, LNCS 3589, pp. 64-73, 2005. XP000197559.

(Continued)

*Primary Examiner* — Isaac M Woo

(74) *Attorney, Agent, or Firm* — Womble Bond Dickinson (US) LLP

(57) ABSTRACT

A method and apparatus for processing join query is disclosed. The method includes: determining a frequent table combination whose emergence frequency in a historical query record is greater than a preset value, and the table combination includes a join key and tables that are joined by using the join key; creating a clustered index according to information about the join key in the frequent table combination; and performing a shuffle operation according to an index column in the clustered index, and saving records that have a same index column value into at least one data block to form a table cluster corresponding to the frequent table combination.

20 Claims, 8 Drawing Sheets

(51) Int. Cl.
  *G06F 16/00* (2019.01)
  *G06F 16/23* (2019.01)
  *G06F 16/28* (2019.01)
  *G06F 16/22* (2019.01)
  *G06F 7/36* (2006.01)
(52) U.S. Cl.
  CPC ...... *G06F 16/2255* (2019.01); *G06F 16/2282* (2019.01); *G06F 16/2393* (2019.01); *G06F 16/285* (2019.01)
(58) Field of Classification Search
  USPC .................................................. 707/600–899
  See application file for complete search history.

(56) References Cited

U.S. PATENT DOCUMENTS

| | | | |
|---|---|---|---|
| 2009/0055370 A1 | 2/2009 | Dagum et al. |
| 2012/0246158 A1 | 9/2012 | Ke |
| 2014/0122484 A1 | 5/2014 | Jagtiani et al. |

FOREIGN PATENT DOCUMENTS

| | | | |
|---|---|---|---|
| CN | 102955843 A | 3/2013 |
| CN | 103488657 A | 1/2014 |
| CN | 104850572 A | 8/2015 |
| CN | 104871153 A | 8/2015 |
| CN | 105095515 A | 11/2015 |
| CN | 105357311 A | 2/2016 |

OTHER PUBLICATIONS

Kamil Bajda-Pawlikowski et al: Efficient processing of data warehousing queries in a split execution environment. Proceedings of the 2011 ACM SIGMODInternational Conference on Management of Data. Jun. 12, 2011, pp. 1165-1176, XP058003216.

Patrick Valouriez et al. Join indices, Microelectronics and Computer Technology Corporation, ACM Transactions on Database Systems, vol. 12, No. 2, Jun. 1987, pp. 218-246. XP058153845.

* cited by examiner

METHOD AND APPARATUS FOR PROCESSING JOIN QUERY

CROSS-REFERENCE TO RELATED APPLICATIONS

This application is a continuation of International Patent Application No. PCT/CN2017/071568, filed on Jan. 18, 2017, which claims priority to Chinese Patent Application No. 201610797295.9, filed on Aug. 31, 2016. The disclosures of the aforementioned applications are herein incorporated by reference in their entireties.

TECHNICAL FIELD

Embodiments of the present invention relate to the field of communications technologies, and in particular, to a method and apparatus for processing join query.

BACKGROUND

As rapid development of network technologies has resulted in a dramatic growth of a data volume, for high-efficient processing of large-scale data, a distributed computing framework based on MapReduce may be used to perform a query analysis task of big data. However, when the query analysis task is performed in the distributed computing framework based on MapReduce, a complex program needs to be written for each task. Therefore, for an online analytical processing (OLAP) complex query, there is a more complex implementation process and lower usability. By contrast, a structured query language (SQL) has higher usability, and therefore the SQL is usually applied to the distributed computing framework based on MapReduce to perform a query analysis of big data.

A join query in an SQL query may join two tables in a database by using a join attribute. Therefore, a distributed hash join technology may be used to determine, in a distributed environment, an equi-join of a column between the two tables. As shown in FIG. 1, a storage node of data of a to-be-processed table needs to be determined first, a map task is started on the determined node, one local hash process is performed on each data block, and data in each data block (block) is grouped into buckets according to a hash value of a key value. For example, data in each data block in FIG. 1 is separately grouped into three buckets, where data in a same bucket has a same hash value of a key value. Then, a shuffle process is performed, and records in a same bucket are transmitted to a same reduce node. Finally, at a reduce stage, a join operation is performed for records that have a same key value in the two tables.

However, in a process of implementing the foregoing method, when key values of data in a data block are scattered, a large quantity of calculations need to be performed in a process of grouping the data into buckets at a map stage, and this requires a relatively long time. In addition, because data in multiple buckets exists in each data block, there are a lot of network connection overheads and data transmission overheads in the shuffle process. With reference to FIG. 1, the data in each data block needs to be separately transmitted to three different reduce nodes. The transmission process takes some time, and finally results in relatively low join query efficiency.

SUMMARY

Embodiments of the present invention provide a join query processing method and apparatus, which can improve join query efficiency.

According to a first aspect, an embodiment of the present invention provides a join query processing method. In the method, a master node determines a frequent table combination. The frequent table combination is a table combination whose emergence frequency in a historical query record is greater than a preset value, and the table combination includes a join key and tables that are joined by using the join key. The master node creates a clustered index according to information about the join key in the frequent table combination, where a quantity of index columns in the clustered index is the same as a quantity of join keys in the frequent table combination, and the clustered index is used to indicate a storage location of records that have a same index column value in the frequent table combination. The master node further controls worker nodes to perform a shuffle operation according to the index columns in the clustered index, and to centrally save the records that have the same index column value into at least one data block to form a table cluster corresponding to the frequent table combination, where the records that have the same index column value are records in the tables that are joined by using the join key. Records that have a same join key can be saved in one data block as much as possible, so that join key values of data in the data block are relatively concentrated, and a calculation amount of bucketing data at a map stage is dramatically reduced when a join query is performed. In addition, because one data block can save data that has a same join key, data of many buckets may not exist in one data block. This may reduce time required for transmitting data to a reduce node at a reduce stage, and improve join query efficiency.

In one embodiment, after the shuffle operation is performed to form the table cluster corresponding to the frequent table combination, a join query operation may be performed. First, a query request is received, where the query request includes a to-be-queried table combination. Then a to-be-queried table cluster corresponding to the to-be-queried table combination is searched for, records that have a same hash value of the index column value in each data block that is included in a node corresponding to the to-be-queried table cluster are separately grouped into one bucket, and records in a same bucket of all data blocks in the to-be-queried table cluster are transmitted to a same data node. Because data that has a same index column value has been centrally saved, bucketing in a map task may be finished without needing to perform a local hash process, thereby reducing a calculation amount of bucketing data and reducing CPU overheads. In addition, the table cluster only saves records that have a same index column value, and records that have different index column values do not need to be processed, so that an amount of data that needs to be processed, a quantity of started tasks, and disk I/Os are reduced. Then, in a shuffle process, most data blocks correspond to only one bucket, that is, one data block corresponds to one index column value. In addition, a reduce task can be performed on a local node of the map task, and most output data that is of the map task and required by a reduce node does not need to be transmitted by using a network. Therefore, network transmission overheads generated in a process of transmitting the data that has the same index column value to the reduce node are dramatically reduced, transmission time is reduced, and join query efficiency is improved.

In one embodiment, when the frequent table combination is to be determined, a table combination needs to be extracted from the historical query record, to generate a table combination set Then the table combination whose emergence frequency is greater than the preset value is selected from the table combination set; a redundant table combination is deleted from the table combination whose emergence frequency is greater than the preset value, and a remaining table combination is determined as the frequent table combination. The table combination whose emergence frequency is greater than the preset value is selected, so that a finally saved table combination is a table combination commonly used by a user, so as to improve query efficiency. In addition, a redundant table combination is deleted, so as to save storage space, reduce an amount of subsequently processed data, and improve processing efficiency.

In one embodiment, a specific method for deleting the redundant table combination from the table combination whose emergence frequency is greater than the preset value is: when there are at least two table combinations that include same tables but different join keys, a table combination that has a largest quantity of join keys is retained; when there are two table combinations that include a same join key, and a set that includes tables in one table combination is a subset of a set that includes tables in the other table combination, a table combination that includes fewer tables is deleted; and when a same table is included in at least two table combinations, the same table is retained only in a table combination that has a highest emergence frequency among the at least two table combinations.

In one embodiment, an implementation of the performing a shuffle operation according to the index columns in the clustered index and centrally saving the records that have the same index column value into at least one data block is: when a total size of the records that include the same index column value reaches a first preset percentage of a storage space size of one data block, and does not exceed the storage space size of one data block, the records that include the same index column value are saved in one data block; when a total size of the records that include the same index column value exceeds a storage space size of one data block, the records that include the same index column value are saved in multiple data blocks; or when a total size of the records that include the same index column value is smaller than a second preset percentage of a storage space size of one data block, multiple records that include same index column values are saved in one data block. It can be seen that according to a relationship between the total size of the records that include the same index column value and the storage space size of one data block, the records that include the same index column value are centrally saved in one or more data blocks as much as possible. Compared with the records being scattered in multiple data blocks, the method may reduce time required for bucketing in a join query process. Therefore, time required for the join query process may be reduced, and join query efficiency may be improved.

In one embodiment, an expression form of a table combination is:

TG=(tab$_1$, . . . , tab$_i$, . . . , tab$_N$) key=(key$_1$, . . . , key$_j$, . . . , key$_M$), where tab$_i$ is the i$^{th}$ table in the table combination, key$_j$ is the j$^{th}$ join key, N is a quantity of tables in the table combination, and M is a quantity of join keys in the table combination.

According to another aspect, an embodiment of the present invention provides a join query processing method. In the method, a master node receives a query request, where the query request includes a to-be-queried table combination. Then, the master node searches a distributed file system DFS for a to-be-queried table cluster corresponding to the to-be-queried table combination. Further, the master the master nodes controls worker nodes to separately group records that have a same hash value of an index column value in each data block that is included in a node corresponding to the to-be-queried table cluster into one bucket, and to transmit records in a same bucket of all data blocks in the to-be-queried table cluster to a same data node. The DFS saves a table cluster corresponding to a frequent table combination that is a table combination whose emergence frequency in a historical query record is greater than a preset value. The table combination includes a join key and tables that are joined by using the join key, a quantity of join keys in the frequent table combination is the same as a quantity of index columns in a clustered index, and the clustered index is used to indicate a storage location of records that have a same index column value in the frequent table combination, where the records that have the same index column value in the frequent table combination are centrally saved in at least one data block to form the table cluster corresponding to the frequent table combination. Because data that has a same index column value has been centrally saved, bucketing in a map task may be finished without needing to perform a local hash process, thereby reducing a calculation amount of bucketing data and reducing CPU overheads. In addition, the table cluster only saves records that have a same index column value, and records that have different index column values do not need to be processed, so that an amount of data that needs to be processed, a quantity of started tasks, and disk I/Os are reduced. Then, in a shuffle process, most data blocks correspond to only one bucket, that is, one data block corresponds to one index column value. In addition, a reduce task can be performed on a local node of the map task, and output data that is of the map task and required by a reduce node does not need to be transmitted by using a network. Therefore, network transmission overheads generated in a process of transmitting the data that has the same index column value to the reduce node are dramatically reduced, transmission time is reduced, and join query efficiency is improved.

According to still another aspect, an embodiment of the present invention provides a join query processing apparatus. The apparatus may implement a function of the master node in the foregoing method embodiments. The function may be implemented by hardware, or may be implemented by hardware executing corresponding software. The hardware or the software includes one or more modules corresponding to the foregoing function.

In one embodiment design, a structure of the apparatus includes a processor and a transceiver, where the processor is configured to support the master node in performing the corresponding function in the foregoing methods. The transceiver is configured to support communication between the master node and another network element. The master node may further include a memory, where the memory is configured to be coupled to the processor and save a program instruction and data required by the apparatus.

According to yet another aspect, an embodiment of the present invention provides a big data analysis system. The system includes the master node described in the foregoing aspects, a metadata storage unit (metastore) for saving a table cluster, a client for sending a join query request, a distributed file system DFS for carrying a data block in the foregoing method, and a worker node for reading and calculating data in the DFS.

According to still yet another aspect, an embodiment of the present invention provides a computer storage medium. The computer storage medium is used to save a computer software instruction used by the foregoing master node, and include a program designed for executing the foregoing aspect.

Compared with the prior art, in the technical solutions provided in the embodiments of the present invention, records that have a same join key may be saved in one data block as much as possible, so that join key values of data in the data block are relatively concentrated, and a calculation amount of bucketing data at a map stage is dramatically reduced when a join query is performed. In addition, because one data block saves data that has a same join key, data of many buckets may not exist in one data block. This may reduce time required for transmitting data to a reduce node at a reduce stage, and improve join query efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description are merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Figure 1:
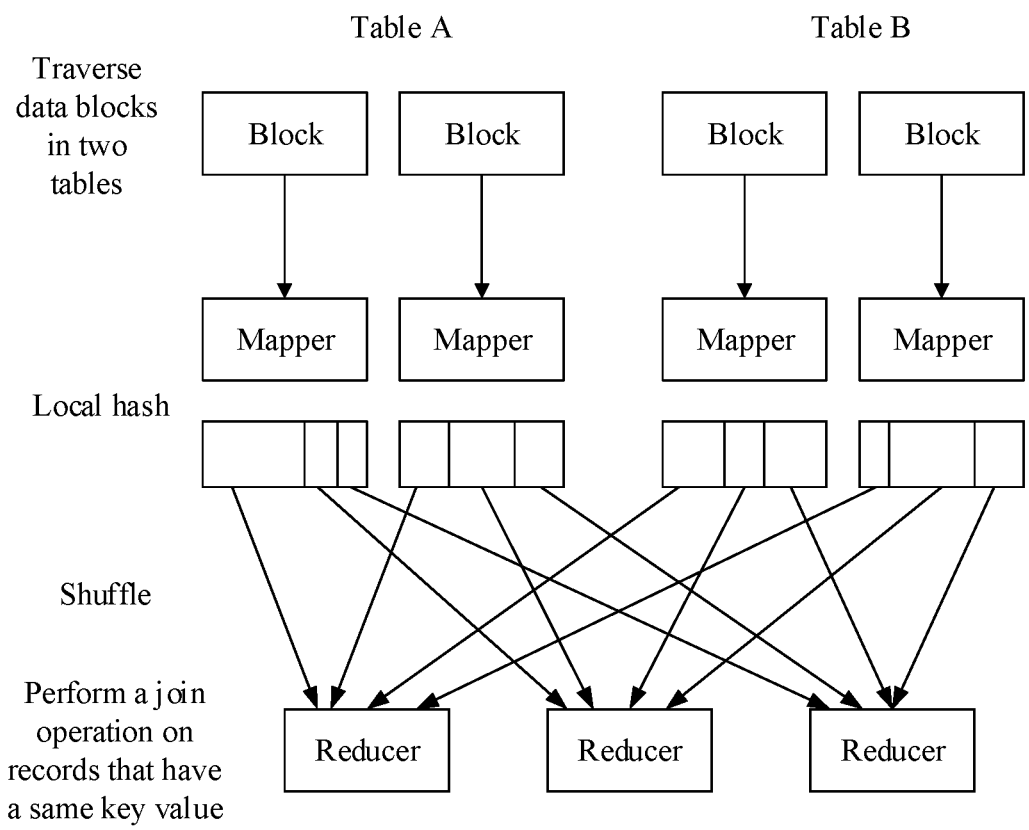
FIG. 1 is an illustrative schematic diagram of a join query processing method in the prior-art.
Figure 2:
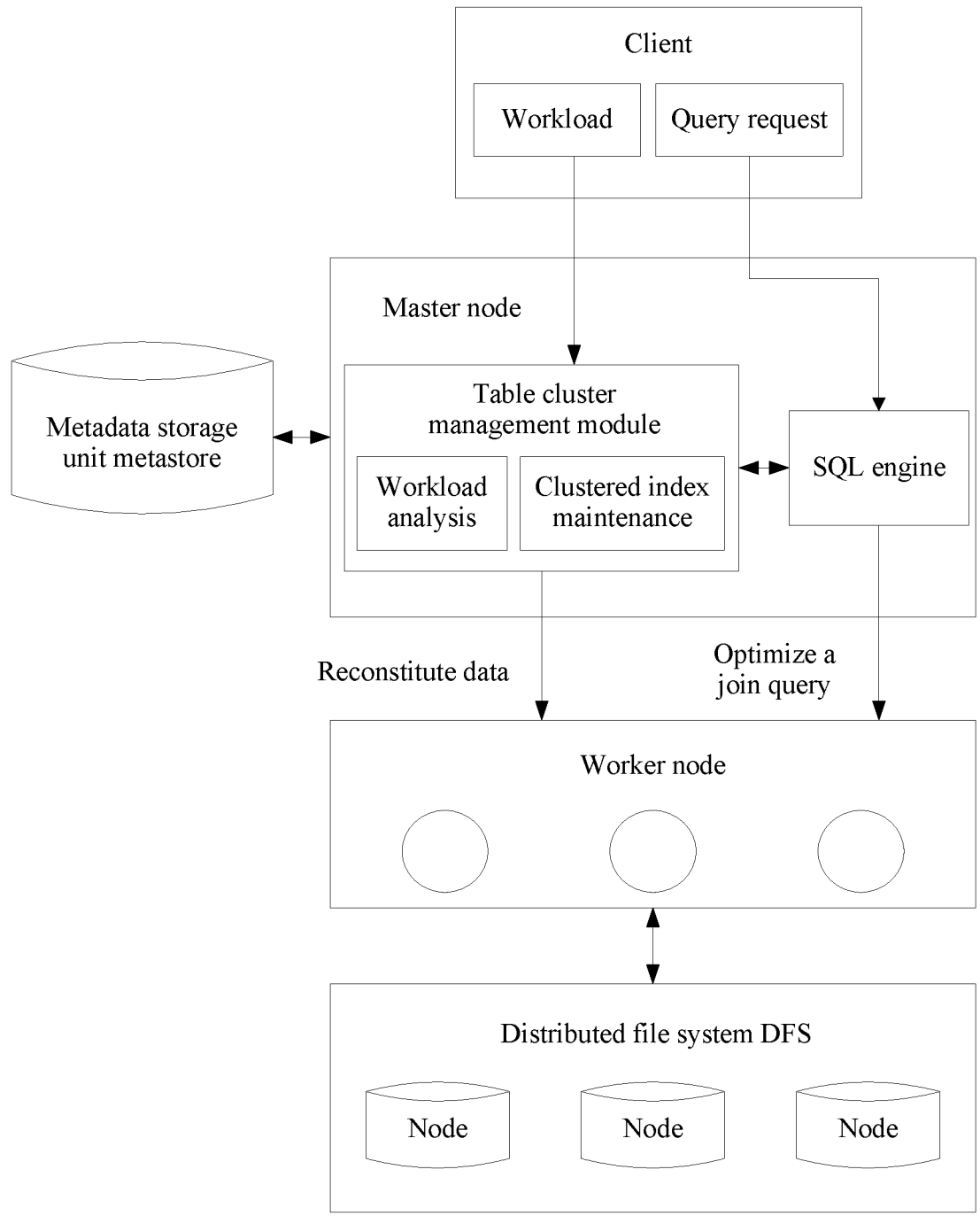
FIG. 2 is a schematic structural diagram of a clustered big data analysis system according to an embodiment of the present invention.

To improve join query efficiency, an embodiment of the present invention provides a join query processing method, and the method may be specifically applied to a clustered big data analysis system. As shown in FIG. 2, the system includes a client a metadata storage unit (metastore), a master node (master), multiple worker nodes (workers), and a distributed file system (DFS).

The master includes a table cluster management module and an SQL engine, where the table cluster management module further includes a workload analysis submodule and a clustered index maintenance submodule. The DFS includes multiple nodes, and each node includes at least one data block (block).

With reference to FIG. 2, a workload is a query set that includes multiple historical SQL queries, and may be obtained by recording a historical SQL query submitted by the client within a preset time period. The master node may create a table cluster structure and a clustered index structure by analyzing a historical SQL query record in the workload, and save a created table cluster into the metastore. Then, the worker nodes reconstitute data in the table cluster, and save the reconstituted data into the corresponding nodes of the DFS. When receiving an SQL query request sent by the client, the master node performs a join query process by using the SQL engine. In the join query process, the SQL engine may invoke the worker nodes to read the data saved in the DFS, and the worker nodes may further perform some calculations. For a specific join query processing method, refer to the following embodiment.

Figure 3:
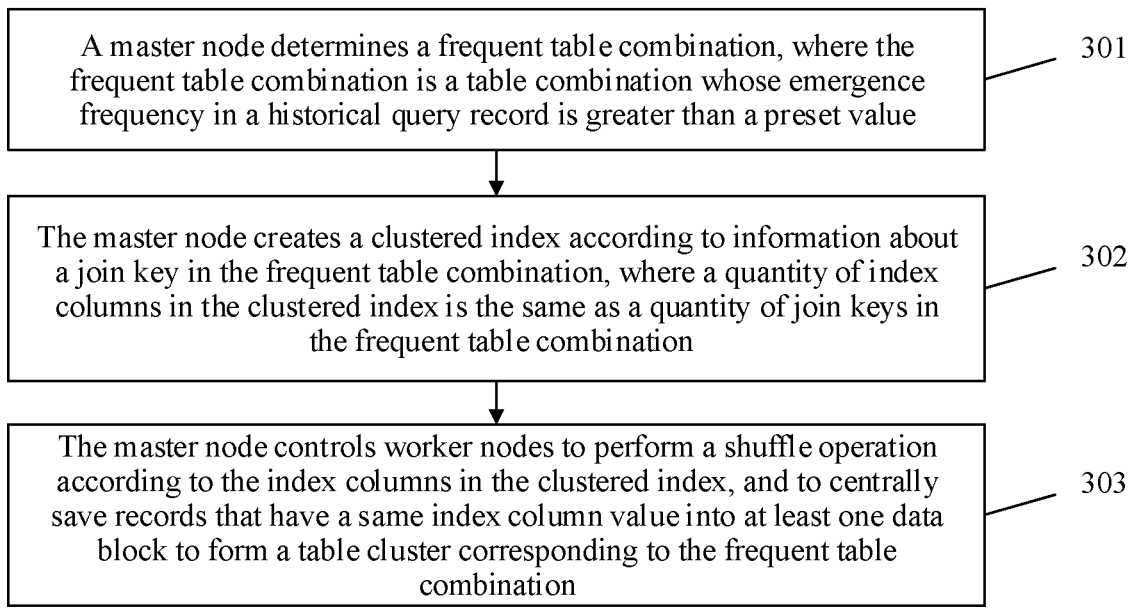
FIG. 3 is a flowchart of a join query processing method according to an embodiment of the present invention.

With reference to the big data analysis system shown in FIG. 2, to improve join query efficiency, an embodiment of the present invention provides a join query processing method. As shown in FIG. 3, the method includes the following operations.

In operation 301, the master node determines a frequent table combination.

The frequent table combination is a table combination whose emergence frequency in a historical query record is greater than a preset value, and the table combination includes a join key and tables that are joined by using the join key.

The join key is a join attribute between the tables, that is, an attribute of a common column between the tables. An expression form of a table combination is:

TG=(tab$_1$, ..., tab$_i$, ..., tab$_N$) key=(key$_1$, ..., key$_j$, ..., key$_M$), where tab$_i$ is the i$^{th}$ table in the table combination, key$_j$ is the j$^{th}$ join key, N is a quantity of tables in the table combination, and M is a quantity of join keys in the table combination.

It should be noted that the historical query record in this operation is a workload that is reported by the client and received by the master node, where the workload is a query set that includes multiple historical SQL queries. The master node may periodically determine the frequent table combination from the workload according to a preset time period.

In operation 302, the master node creates a clustered index according to information about a join key in the frequent table combination, where a quantity of index columns in the clustered index is the same as a quantity of join keys in the frequent table combination.

One join key corresponds to one index column. When the quantity M of join keys is equal to 1, a single-column index is created; or when the quantity M of join keys is greater than or equal to 2, a composite index is created.

It should be noted that the clustered index is used to indicate a storage location of records that have a same index column value in the frequent table combination. For example, the frequent table combination includes a table A and a table B, the table A and the table B have a common column, and the clustered index is used to indicate a storage location of records that are in the table A and the table B and that have a same index column value.

In operation 303, the master node controls the worker nodes to perform a shuffle operation according to the index columns in the clustered index, and to centrally save records that have a same index column value into at least one data block to form a table cluster corresponding to the frequent table combination.

The records that have the same index column value are records in the tables that are joined by using the join key. One table cluster includes a group of tables that share a data block, and a common column of tables in a table combination is a clustered index of a table cluster. Records that are in all tables of a table combination and that include a same index column value are saved in at least one data block, so that the records that include the same index column value may be relatively centrally saved.

For example, if storage space of one data block is enough to save the records that are in all the tables of the table combination and that include the same index column value, the records that have the same index column value are centrally saved in one data block.

It should be noted that when the shuffle operation needs to be performed, the master node may send a control instruction to the worker nodes, so as to control the worker nodes to perform the shuffle operation and centrally save the records that have the same index column value into at least one data block in the DFS.

It should be further noted that operations 301 to 302 are specifically performed by the table cluster management module in the master node.

According to the join query processing method provided in this embodiment of the present invention, a frequent table combination is determined, a clustered index is created according to information about a join key in the frequent table combination, a shuffle operation is performed according to index columns in a clustered index, and records that have a same index column value are centrally saved in at least one data block to form a table cluster corresponding to the frequent table combination. By means of the method, records that have a same join key may be saved in one data block as much as possible, so that join key values of data in the data block are relatively concentrated, and a calculation amount of bucketing data at a map stage is dramatically reduced when a join query is performed. In addition, because one data block saves data that has a same join key, data of many buckets may not exist in one data block. This may reduce time required for transmitting data to a reduce node at a reduce stage, and improve join query efficiency.

Figure 4:
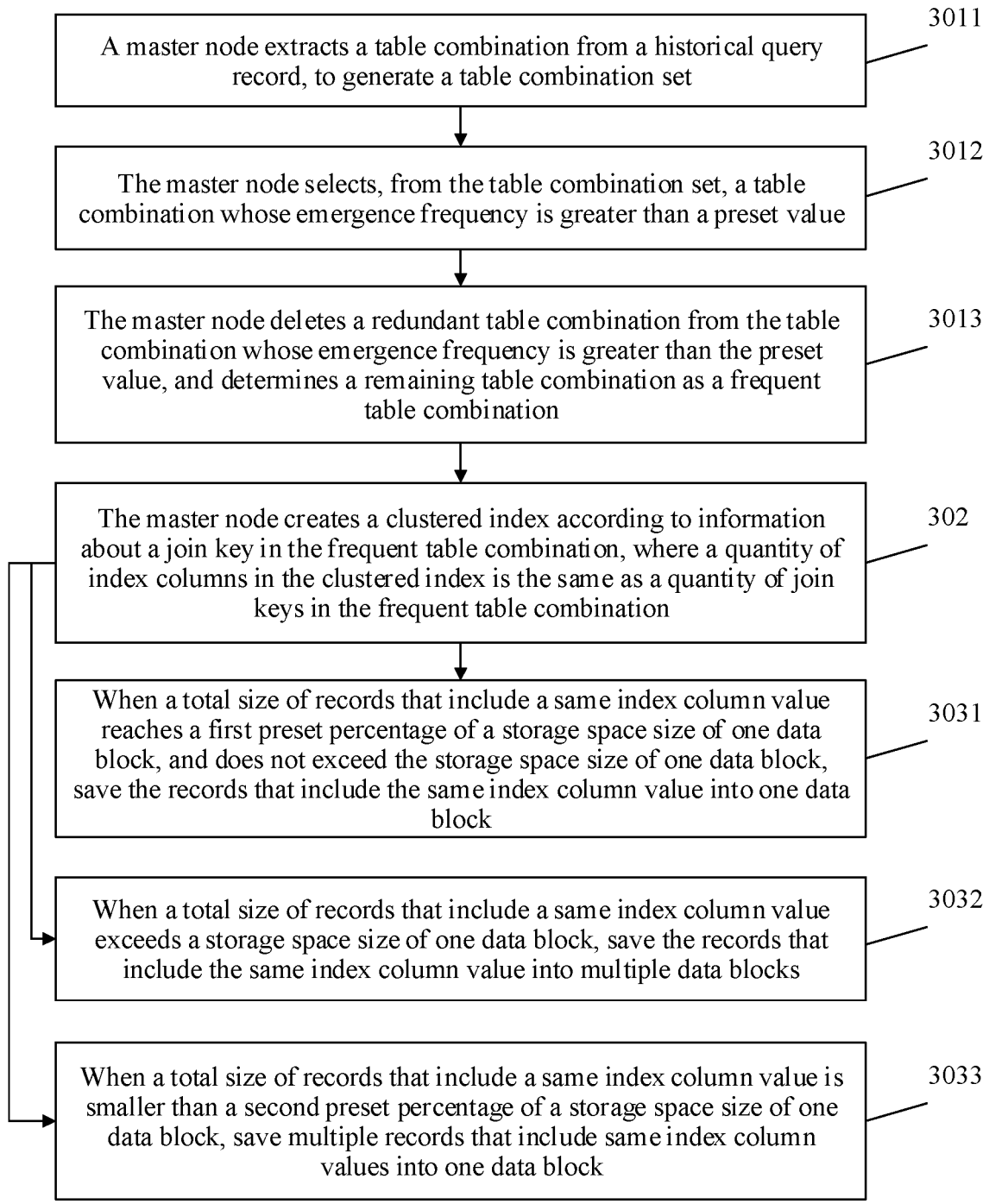
FIG. 4 is a flowchart of another join query processing method according to an embodiment of the present invention.

With reference to FIG. 2, it should be noted that the frequent table combination in this embodiment of the present invention is determined by the master node according to the workload reported by the client. Based on this, in another implementation provided in this embodiment of the present invention, a method for determining the frequent table combination is described in detail. As shown in FIG. 4, the foregoing operation 301 that the master node determines a frequent table combination may be specifically implemented in operations 3011 to 3013.

In operation 3011, the master node extracts a table combination from a historical query record, to generate a table combination set.

The master node performs a format conversion on each query record in the workload, and extracts, from an SQL query statement, tables that are joined by using a join key, to form a table combination. If there are multiple query statements in one query record, one table combination is generated according to each query statement, and all generated table combinations form a table combination set.

For example, one query record is:
web_sales ws JOIN warehouse w ON ws.ws_warehouse_sk=w.w_warehouse_sk,
catalog_sales cs JOIN ship_mode sm ON cs.cs_mode_sk= sm.sm_ship_mode_sk.

It can be seen that the query statement includes two join queries. A table combination obtained by performing a format conversion on the first join query is:
TQ1: (web_sales, warehouse) key=warehouse_sk.

In the table combination, web_sales and warehouse are two tables, and a join key between the two tables is warehouse_sk.

A table combination obtained by performing a format conversion on the second join query is:
TQ2: (catalog_sales, ship_mode) key=ship_mode_sk.

In the table combination, catalog_sales and ship_mode are two tables, and a join key between the two tables is ship_mode_sk.

In operation 3012, the master node selects, from the table combination set, a table combination whose emergence frequency is greater than a preset value.

After the table combination set is generated, the table combination whose emergence frequency in the table combination set is greater than the preset value may be calculated by using a frequent item set mining algorithm. The table combination whose emergence frequency in the table combination set is greater than the preset value forms a frequent table combination set.

In operation 3013, the master node deletes a redundant table combination from the table combination whose emergence frequency is greater than the preset value, and determines a remaining table combination as the frequent table combination.

It should be noted that the frequent table combination set generated in the foregoing operation 3012 may have a redundant table combination, and any one or more of the following three rules may be used to filter out the redundant table combination.

Rule 1:

When there are at least two table combinations that include same tables but different join keys, a table combination that has a largest quantity of join keys is retained.

For example, there is a table combination TG 1: (catalog_sales, catalog_returns) key=item_sk, and a table combination TG 2: (catalog_sales, catalog_returns) key=item_sk and order_number.

It can be seen that tables included in both TG 1 and TG 2 are catalog_sales and catalog_returns, but TG 1 has only one join key item_sk, and TG 2 has two join keys item_sk and order_number. Apparently, TG 1 and TG 2 include same tables, but TG 2 has more join keys than TG1 has. Therefore, the table combination TG 2 is retained, and the table combination TG 1 is deleted.

Rule 2:

When there are two table combinations that include a same join key, and a set that includes tables in one table combination is a subset of a set that includes tables in the other table combination, a table combination that includes fewer tables is deleted.

For example, there is a table combination TG 1: (catalog_sales, catalog_returns) key=item_sk, and a table combination TG 2: (catalog_sales, catalog_returns, item) key=item_sk.

It can be seen that TG 1 and TG 2 include a same join key item_sk, and a set {catalog_sales, catalog_returns} that includes tables in TG 1 is a subset of a set {catalog_sales, catalog_returns, item} that includes tables in TG 2. Therefore, the table combination TG 1 is deleted, and the table combination TG 2 is retained.

Rule 3:

When a same table is included in at least two table combinations, the same table is retained only in a table combination that has a highest emergence frequency among the at least two table combinations.

For example, there is a table combination TG 1: (catalog_sales, ship_mode) key=item_sk, a table combination TG 2: (catalog_sales, web_sales, item) key=item_sk and order_number, and a table combination TG 3: (catalog_sales, catalog_returns, item) key=item_sk.

It can be seen that TG 1, TG 2, and TG 3 all include catalog_sales. If it is determined, by using the frequent item set mining algorithm, that TG 3 is a table combination that has a highest emergence frequency, catalog_sales is deleted from TG 1 and TG 2, and is retained only in TG 3. After the deletion, TG 1 becomes (ship_mode) key=item_sk, and TG 2 becomes (web_sales, item) key=item_sk and order_number.

It should be further noted that if a table combination includes only one member table after a same table is deleted from the table combination, no table combination can be formed, and the table combination is directly deleted. For example, after catalog_sales is deleted from TG 1, there is only one table ship_mode in TG 1; in this case, the table combination TG 1 may be directly deleted.

Figure 5:
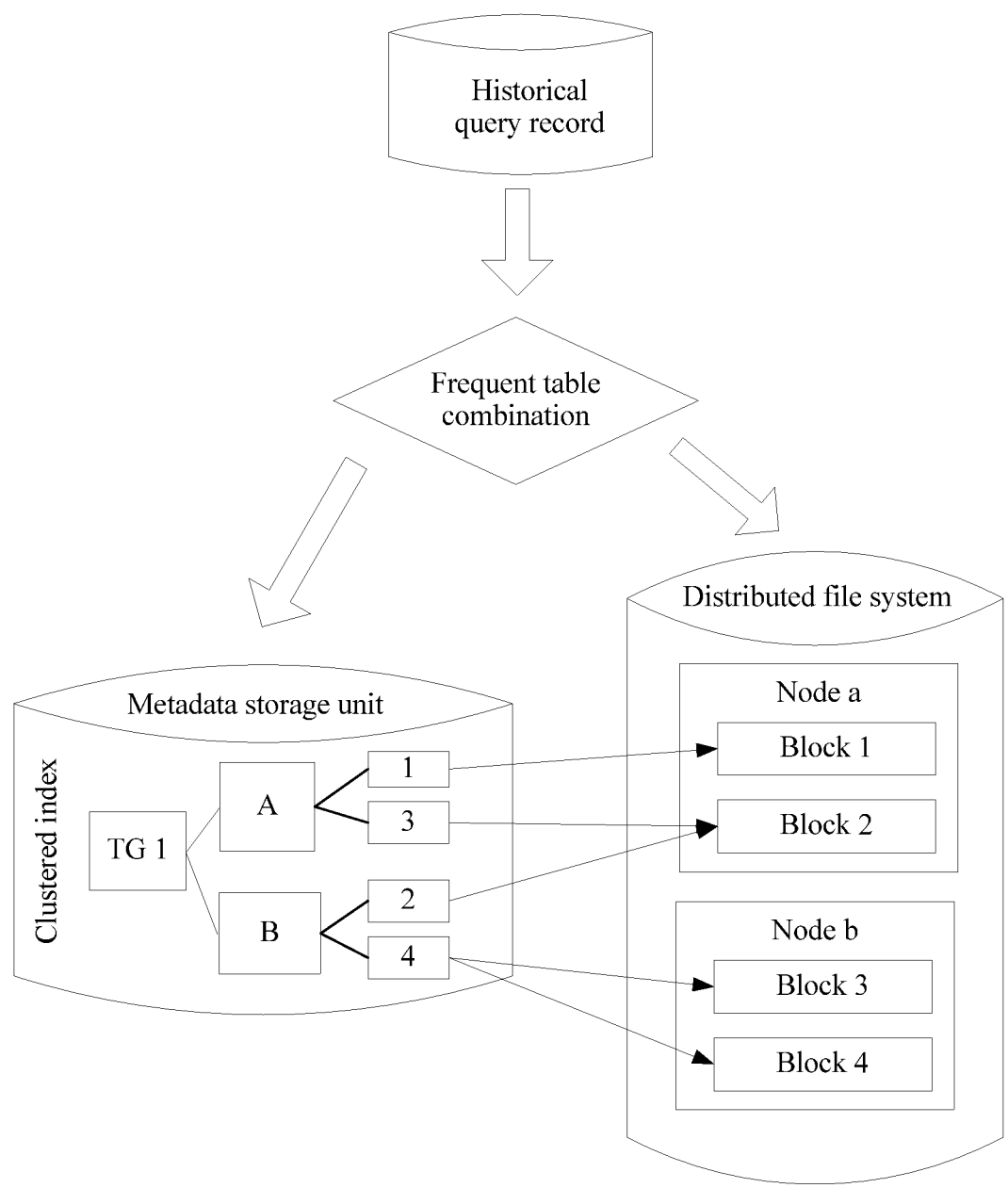
FIG. 5 is an illustrative schematic diagram of a join query processing method according to an embodiment of the present invention.

As shown in FIG. 5, FIG. 5 is an illustrative schematic diagram of a creating process of a distributed table cluster provided in an embodiment of the present invention. After a table combination is generated, a clustered index needs to be further created, so that a table cluster is generated according to the clustered index and saved in a data block. The following describes a method for saving the table combination. The foregoing operation 303 that the master node controls the worker nodes to perform a shuffle operation according to the index columns in the clustered index, and to save records that have a same index column value and that are in tables joined by using a join key into at least one data block may be specifically implemented in operations 3031 to 3033.

In operation 3031, when a total size of the records that include the same index column value reaches a first preset percentage of a storage space size of one data block, and does not exceed the storage space size of one data block, save the records that include the same index column value into one data block.

The first preset percentage may be 80%.

With reference to FIG. 5, for example, in a frequent table combination TG 1: (catalog_sales, catalog_returns) key=item_sk and order_number, join keys item_sk and order_number separately correspond to one index column, index column values of an index column corresponding to the join key item_sk include A and B, and index column values of an index column corresponding to the join key order_number include 1, 2, 3, and 4.

A total size of records that include a first index column value (A, 1) reaches 80% of a total size of a block 1, and does not exceed the total storage space size of the block 1. Therefore, only the records that include an index column value (A, 1) may be saved in the block 1.

In operation 3032, when a total size of the records that include the same index column value exceeds a storage space size of one data block, save the records that include the same index column value into multiple data blocks.

For example, a total size of records that include a fourth index column value (B, 4) exceeds a storage space size of one data block, and therefore the records that include the index column value (B, 4) are saved in two data blocks: block 3 and block 4.

In operation 3033, when a total size of the records that include the same index column value is smaller than a second preset percentage of a storage space size of one data block, save multiple records that include same index column values into one data block.

For example, a total size of records that include a second index column value (A, 3) and records that include a third index column value (B, 2) does not exceed a total storage space size of a block 2, and therefore the records that include the second index column value (A, 3) and the records that include the third index column value (B, 2) are both saved in the block 2.

According to the join query processing method provided in this embodiment of the present invention, a table combination whose emergence frequency is greater than a preset value is selected, so that a finally saved table combination is a table combination commonly used by a user, so as to improve query efficiency. In addition, a redundant table combination is deleted, so as to save storage space. Finally, according to a relationship between a total size of records that include a same index column value and a storage space size of one data block, the records that include the same index column value are centrally saved in one or more data blocks as much as possible. Compared with being scattered in multiple data blocks, the records that include the same index column value are centrally saved in the one or more data blocks, and therefore it can be considered that bucketing has been performed when data is saved in a data block, so that time required for bucketing in a join query process is saved. Therefore, time required for the join query process may be reduced, and join query efficiency may be improved.

Figure 6:
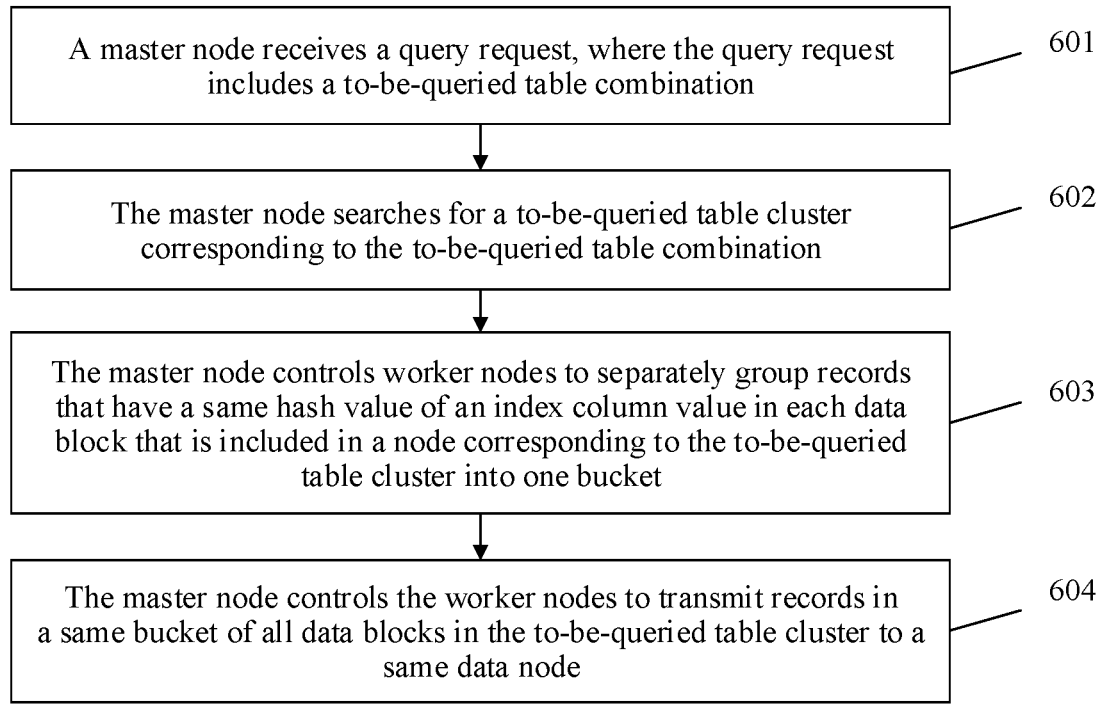
FIG. 6 is a flowchart of still another join query processing method according to an embodiment of the present invention.

With reference to the method process shown in FIG. 3, after a table cluster is created, a subsequent join query operation may be performed. Based on the table cluster created in the embodiment of the present invention, in an implementation provided in an embodiment of the present invention, a join query processing process based on the table cluster created in the foregoing embodiment is further provided. As shown in FIG. 6, the method further includes the following operations.

In operation 601, a master node receives a query request, where the query request includes a to-be-queried table combination.

It should be noted that when receiving an SQL query request after the table cluster is created, an SQL engine in the master node needs to determine, by querying a compiler, the to-be-queried table combination on which the query request requests to perform a join calculation.

In operation 602, the master node searches for a to-be-queried table cluster corresponding to the to-be-queried table combination.

After determining the to-be-queried table combination, the SQL engine in the master node may determine, by using a table cluster management module, the to-be-queried table cluster corresponding to the to-be-queried table combination.

In operation 603, the master node controls worker nodes to separately group records that have a same hash value of an index column value in each data block that is included in a node corresponding to the to-be-queried table cluster into one bucket.

It should be noted that when the SQL engine in the master node receives the SQL query request, the master node may send a control instruction to the worker nodes, so as to control the worker nodes to perform a subsequent MapReduce process.

Figure 7:
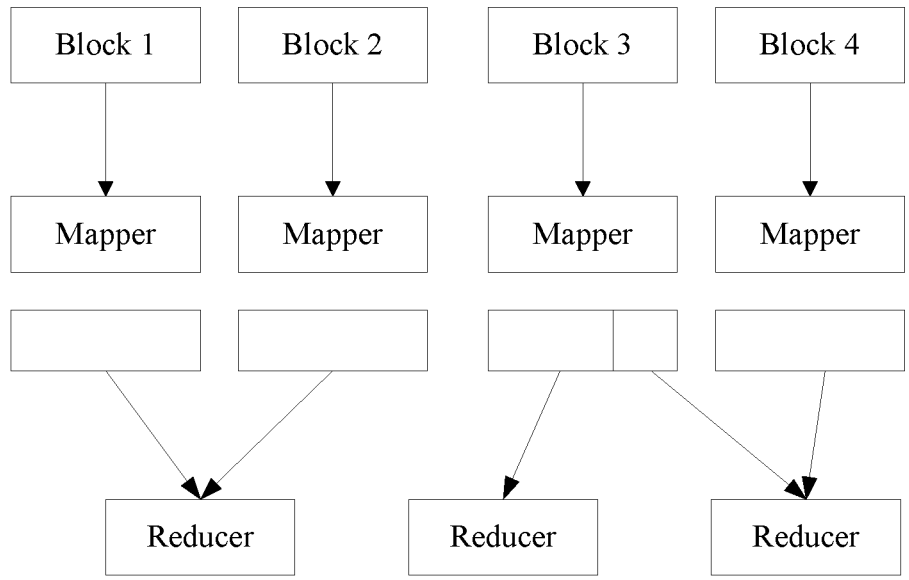
FIG. 7 is an illustrative schematic diagram of another join query processing method according to an embodiment of the present invention.

After determining the to-be-queried table cluster, the SQL engine may read data about the to-be-queried table cluster in a distributed file system by using the worker nodes. A process of performing a join query on the to-be-queried table cluster is shown in FIG. 7. The master node controls the worker nodes to separately start a map program on two nodes. Because data that has a same index column value (key value) has been centrally saved, the map program may finish a bucket operation without needing to perform a local hash process. For example, in FIG. 7, block 1 only saves records whose index column value is 1, and therefore all the records saved in the block 1 is one bucket; block 2 also only saves records whose index column value is 1, and therefore all the records saved in the block 2 is one bucket; block 3 separately saves records whose index column value is 2 and a part of records whose index column value is 3, and the records whose index column value is 2 and the records whose index column value is 3 are independently saved, and therefore data saved in the block 3 may be grouped into two buckets without needing to perform local hash; block 4 only saves records whose index column value is 3, and therefore all the records saved in the block 4 is one bucket.

In operation 604, the master node controls the worker nodes to transmit records in a same bucket of all data blocks in the to-be-queried table cluster to a same data node.

According to the join query processing method provided in this embodiment of the present invention, when a query request is received after a table cluster is created, a to-be-queried table combination in the query request is determined, then a to-be-queried table cluster corresponding to the to-be-queried table combination is searched for, and a map task is performed on a node corresponding to the to-be-queried table cluster. Because data that has a same index column value has been centrally saved, bucketing in the map task may be finished without needing to perform a local hash process, thereby reducing a calculation amount of bucketing data and reducing CPU overheads. In addition, the table cluster only saves records that have a same index column value, and records that have different index column values do not need to be processed, so that an amount of data that needs to be processed, a quantity of started tasks, and disk I/Os are reduced. Then, in a shuffle process, most data blocks correspond to only one bucket, that is, one data block corresponds to one index column value. In addition, a reduce task is preferably performed on a local node of the map task, and most output data that is of the map task and required by a reduce node does not need to be transmitted by using a network. Therefore, network transmission overheads generated in a process of transmitting the data that has the same index column value to the reduce node are dramatically reduced, transmission time is reduced, and join query efficiency is improved.

The foregoing mainly describes the solutions provided in the embodiments of the present invention from a perspective of interaction between various network elements. It can be understood that, to implement the foregoing functions, each network element such as a join query apparatus includes a corresponding hardware structure and/or software module for performing each function. A person skilled in the art may be easily aware that, in combination with units and algorithm operations of the examples described in the embodiments disclosed in this specification, the present invention may be implemented by hardware, or a combination of hardware and computer software. Whether a function is performed by hardware or computer software-driven hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional modules of the master node or the like shown in FIG. 2 may be divided according to the foregoing method examples. For example, each functional module may be divided according to each function, or two or more functions may be integrated into one processing module. The foregoing integrated module may be implemented in a form of hardware, or may be implemented in a form of a software functional module. It should be noted that in the embodiments of the present invention, the module division is merely an example of logical function division, and may be other division in an actual implementation.

Figure 8:
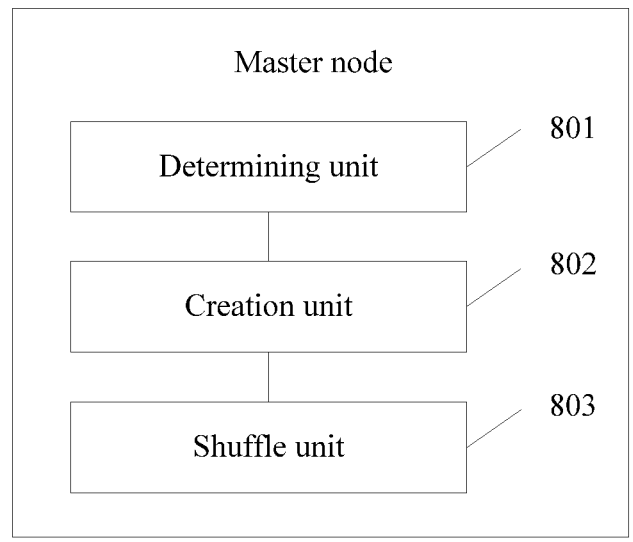
FIG. 8 is a schematic diagram of a logical structure of a join query processing apparatus according to an embodiment of the present invention.

When each functional module is divided according to each function, FIG. 8 shows a possible schematic structural diagram of the master node described in the foregoing embodiments. FIG. 8 is specifically a schematic structural diagram of the table cluster management module in the master node shown in FIG. 2. The master node includes a determining unit 801, a creation unit 802, and a shuffle unit 803. The determining unit 801 is configured to support the master node in performing operation 301 in FIG. 3 and operations 3011 to 3013 in FIG. 4. The creation unit 802 is configured to support the master node in performing operation 302 in FIG. 3. The shuffle unit 803 is configured to support the master node in controlling worker nodes to perform operation 303 in FIG. 3, and support the master node in performing operations 3031 to 3033 in FIG. 4.

Figure 9:
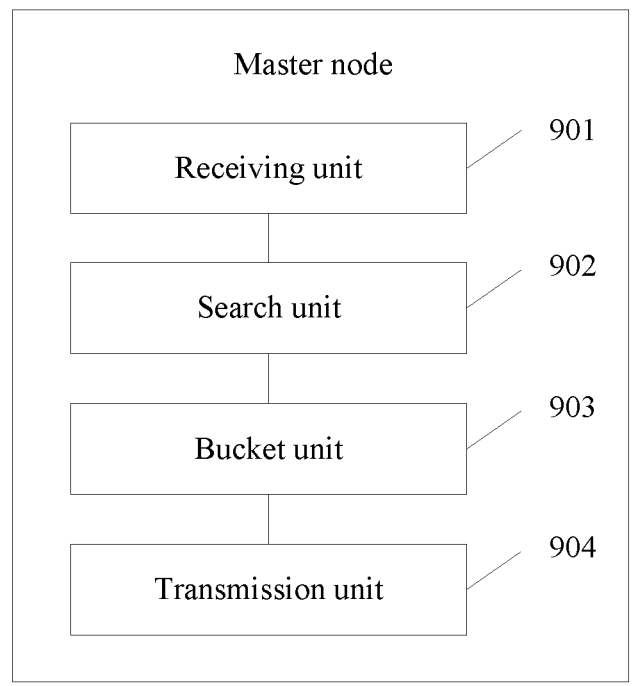
FIG. 9 is a schematic diagram of a logical structure of another join query processing apparatus according to an embodiment of the present invention.

When each functional module is divided according to each function, FIG. 9 further shows another possible schematic structural diagram of the master node described in the foregoing embodiments. FIG. 9 is specifically a schematic structural diagram of the SQL engine in the master node described in FIG. 2. The master node includes a receiving unit 901, a search unit 902, a bucket unit 903, and a transmission unit 904. The receiving unit 901 is configured to support the master node in performing operation 601 in FIG. 6. The search unit 902 is configured to support the master node in performing operation 602 in FIG. 6. The bucket unit 903 is configured to support the master node in controlling worker nodes to perform operation 603 in FIG. 6. The transmission unit 904 is configured to support the master node in controlling the worker nodes to perform operation 604 in FIG. 6.

All the related content of each operation described in the foregoing method embodiments may be cited in a functional description corresponding to a functional module, and details are not described herein.

Figure 10:
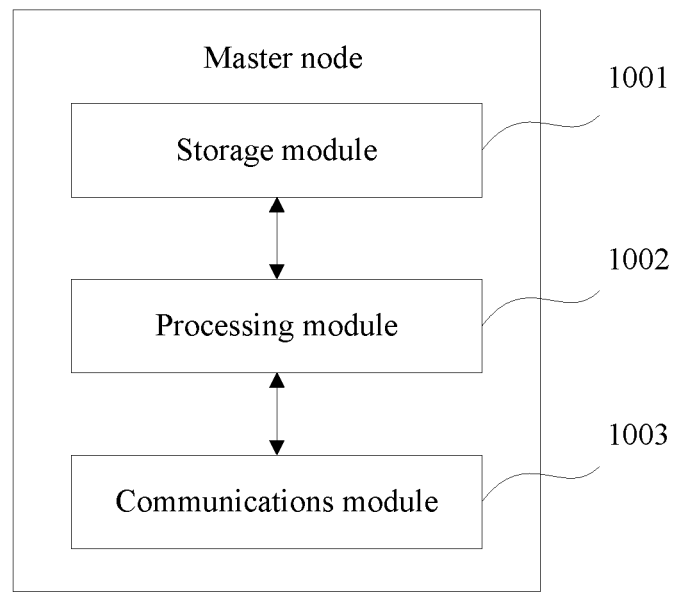
FIG. 10 is a schematic diagram of a logical structure of still another join query processing apparatus according to an embodiment of the present invention.

When an integrated unit is used, FIG. 10 shows a possible schematic structural diagram of the master node described in the foregoing embodiments. The master node includes a processing module 1002 and a communications module 1003. The processing module 1002 is configured to control and manage an action of the master node. For example, the processing module 1002 is configured to support operations 301 to 303 in FIG. 3, operations 3011 to 3033 in FIG. 4, and operations 602 to 603 in FIG. 6. The communications module 1003 is configured to support communication between the master node and another network entity. For example, the communications module 1003 is configured to support operations 601 and 604 in FIG. 6, and may implement communication between functional modules or network entities shown in FIG. 2 or FIG. 5. The master node further includes a storage module 1001, configured to save program code and data of the master node.

The processing module 1002 may be a processor or a controller, such as a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 1002 may implement or execute various logical boxes, modules, and circuits for illustration purposes described in the disclosed content of the present invention. The processing module 1002 may also be a combination that implements a calculation function, such as a combination that includes one or more microprocessors, or a combination of a DSP and a microprocessor. The communications module 1003 may be a transceiver, a transceiver circuit, a communications interface, or the like. The storage module 1001 may be a memory.

FIG. 8 to FIG. 10 are schematic structural diagrams when the master node is implemented as software. The master node may also be in a form of hardware. That is, when the processing module 1002 is a processor, the communications module 1003 is a transceiver, and the storage module 1001 is a memory, the master node described in the embodiments of the present invention may be the master node shown in FIG. 11.

Figure 11:
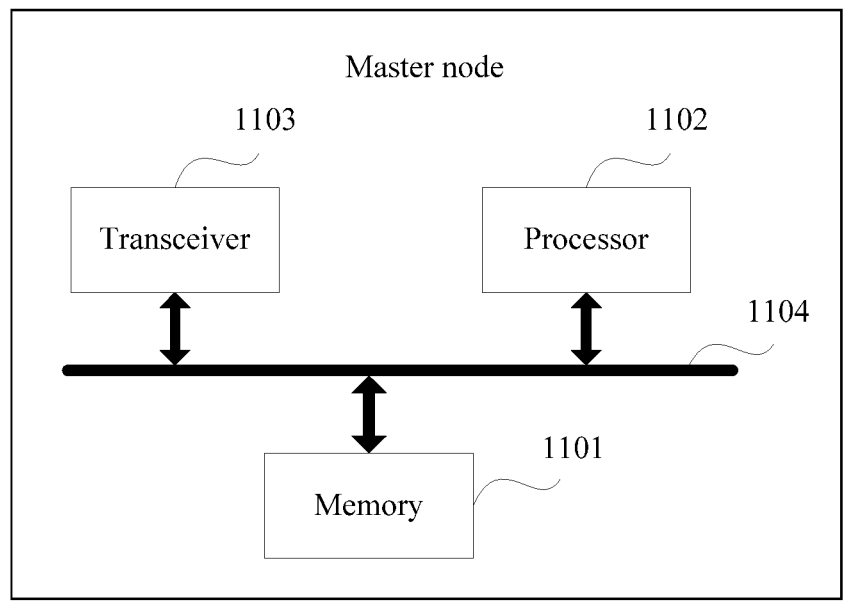
FIG. 11 is a schematic diagram of a logical structure of yet another join query processing apparatus according to an embodiment of the present invention.

As shown in FIG. 11, when implemented as hardware, the master node includes a processor 1102, a transceiver 1103, a memory 1101, and a bus 1104. The transceiver 1103, the processor 1102, and the memory 1101 are interconnected by using the bus 1104. The bus 1104 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 11, but this does not mean that there is only one bus or only one type of bus.

It should be noted that in the embodiments of the present invention, the master node and the worker nodes may be separately a stand-alone device, or exist in a form of software. For example, in a computer cluster system, a function of the master node and a function of the worker nodes may be implemented by different virtual machines in the system.

The method or algorithm operations described in the disclosed content of the present invention may be implemented in a form of hardware, or may be implemented by a processor by executing a software instruction. The software instruction may include a corresponding software module. The software module may be saved in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, the functions described in the present invention may be implemented by hardware, software, firmware, or any combination thereof. When the present invention is implemented by software, the foregoing functions may be saved in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The embodiments in this specification are all described in a progressive manner. For same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A join query processing method, comprising:
   determining a frequent table combination, wherein the frequent table combination is a table combination whose emergence frequency in a historical query record is greater than a preset value, and wherein the table combination comprises a join key and tables that are joined by using the join key;
   creating a clustered index according to information about the join key in the frequent table combination, wherein a quantity of index columns in the clustered index is the same as a quantity of join keys in the frequent table combination, and wherein the clustered index indicates a storage location of records that have a same index column value in the frequent table combination; and
   performing a shuffle operation according to the index columns in the clustered index, and centrally saving the records that have the same index column value into at least one data block to form a table cluster corresponding to the frequent table combination, wherein at least one of the at least one data block includes one index column value, and wherein the records that have the same index column value are records in the tables that are joined by using the join key.

2. The join query processing method according to claim 1, further comprising:
   receiving a query request, wherein the query request comprises a first table combination;
   searching for a first table cluster corresponding to the first table combination;

grouping records that have a same hash value of the index column value in a data block that is comprised in a data node corresponding to the first table cluster into one bucket; and transmitting records in a same bucket to a same data node.

3. The join query processing method according to claim 2, wherein determining the frequent table combination comprises:

extracting at least one table combination from the historical query record, to generate a table combination set;

selecting, from the generated table combination set, a second table combination whose emergence frequency is greater than the preset value; and deleting a redundant table combination from the second table combination to obtain the frequent table combination.

4. The join query processing method according to claim 3, wherein deleting the redundant table combination from the second table combination comprises:

when there are at least two table combinations that comprise same tables but different join keys, retaining a table combination that has a largest quantity of join keys;

when there are two table combinations that comprise a same join key, and a set that comprises tables in one table combination is a subset of a set that comprises tables in the other table combination, deleting a table combination that comprises fewer tables; and when a same table is comprised in at least two table combinations, retaining the same table only in a table combination that has a highest emergence frequency among the at least two table combinations.

5. The join query processing method according to claim 1, wherein performing the shuffle operation according to the index columns in the clustered index, and centrally saving the records that have the same index column value into at least one data block comprises:

when a total size of the records that comprise the same index column value reaches a first preset percentage of a storage space size of one data block, and does not exceed the storage space size of one data block, saving the records that comprise the same index column value into one data block.

6. The join query processing method according to claim 1, wherein performing the shuffle operation according to the index columns in the clustered index, and centrally saving the records that have the same index column value into at least one data block comprises:

when a total size of the records that comprise the same index column value exceeds a storage space size of one data block, saving the records that comprise the same index column value into multiple data blocks.

7. The join query processing method according to claim 1, wherein performing the shuffle operation according to the index columns in the clustered index, and centrally saving the records that have the same index column value into at least one data block comprises:

when a total size of the records that comprise the same index column value is smaller than a second preset percentage of a storage space size of one data block, saving multiple records that comprise same index column values into one data block.

8. The join query processing method according to claim 1, wherein an expression form of the table combination is:

TG=(tab$_1$, ..., tab$_i$, ..., tab$_N$) key=(key$_1$, ..., key$_j$, ..., key$_M$), wherein tab$_i$ is the $i^{th}$ table in the table combination, key is the $j^{th}$ join key, N is a quantity of tables in the table combination, and M is a quantity of join keys in the table combination.

9. A join query processing apparatus, comprising:

a processor, and a memory coupled to the processor;

wherein the memory stores computer instructions, and the processor is configured to execute the instructions stored in the memory to:

determine a frequent table combination, wherein the frequent table combination is a table combination whose emergence frequency in a historical query record is greater than a preset value, and wherein the table combination comprises a join key and tables that are joined by using the join key;

create a clustered index according to information about the join key in the frequent table combination, wherein a quantity of index columns in the clustered index is the same as a quantity of join keys in the frequent table combination; and perform a shuffle operation according to the index columns in the clustered index created by the creation unit, and centrally save records that have a same index column value into at least one data block to form a table cluster corresponding to the frequent table combination, wherein at least one of the at least one data block includes one index column value, and wherein the records that have the same index column value are records in the tables that are joined by using the join key.

10. The join query processing apparatus according to claim 9, further comprising:

a transceiver, configured to receive a query request, wherein the query request comprises a first table combination; and wherein the processor is further configured to: search for a first table cluster corresponding to the first table combination; group records that have a same hash value of the index column value in a data block that is comprised in a data node corresponding to the first table cluster into one bucket; and using the transceiver to transmit records in a same bucket to a same data node.

11. The join query processing apparatus according to claim 10, wherein the processor is further configured to: extract at least one table combination from the historical query record, to generate a table combination set; select, from the generated table combination set, a second table combination whose emergence frequency is greater than the preset value; and delete a redundant table combination from the second table combination to obtain the frequent table combination.

12. The join query processing apparatus according to claim 11, wherein the processor is further configured to: when there are at least two table combinations that comprise same tables but different join keys, retain a table combination that has a largest quantity of join keys; when there are two table combinations that comprise a same join key, and a set that comprises tables in one table combination is a subset of a set that comprises tables in the other table combination, delete a table combination that comprises fewer tables; and when a same table is comprised in at least two table combinations, retain the same table only in a table combination that has a highest emergence frequency among the at least two table combinations.

13. The join query processing apparatus according to claim 9, wherein
the processor is further configured to: when a total size of the records that comprise the same index column value reaches a first preset percentage of a storage space size of one data block, and does not exceed the storage space size of one data block, save the records that comprise the same index column value into one data block.

14. The join query processing apparatus according to claim 9, wherein
the processor is further configured to: when a total size of the records that comprise the same index column value exceeds a storage space size of one data block, save the records that comprise the same index column value into multiple data blocks.

15. The join query processing apparatus according to claim 9, wherein
the processor is further configured to: when a total size of the records that comprise the same index column value is smaller than a second preset percentage of a storage space size of one data block, save multiple records that comprise same index column values into one data block.

16. The join query processing apparatus according to claim 9, wherein an expression form of the table combination is:
TG=(tab$_1$, ..., tab$_i$, ..., tab$_N$) key=(key$_1$, ..., key$_j$, ..., key$_M$), wherein
tab$_i$ is the i$^{th}$ table in the table combination, key$_j$ is the j$^{th}$ join key, N is a quantity of tables in the table combination, and M is a quantity of join keys in the table combination.

17. A non-transitory computer storage medium storing computer software instructions which, when executed by a master node, causes the master node to perform the following operations:
determining a frequent table combination, wherein the frequent table combination is a table combination whose emergence frequency in a historical query record is greater than a preset value, and wherein the table combination comprises a join key and tables that are joined by using the join key;
creating a clustered index according to information about the join key in the frequent table combination, wherein a quantity of index columns in the clustered index is the same as a quantity of join keys in the frequent table combination, and wherein the clustered index indicates a storage location of records that have a same index column value in the frequent table combination; and
performing a shuffle operation according to the index columns in the clustered index, and centrally saving the records that have the same index column value into at least one data block to form a table cluster corresponding to the frequent table combination, wherein at least one of the at least one data block includes one index column value, and wherein the records that have the same index column value are records in the tables that are joined by using the join key.

18. The non-transitory computer storage medium according to claim 17, further comprising:
receiving a query request, wherein the query request comprises a first table combination;
searching for a first table cluster corresponding to the first table combination;
grouping records that have a same hash value of the index column value in a data block that is comprised in a data node corresponding to the first table cluster into one bucket; and
transmitting records in a same bucket to a same data node.

19. The non-transitory computer storage medium according to claim 18, wherein determining the frequent table combination comprises:
extracting at least one table combination from the historical query record, to generate a table combination set;
selecting, from the generated table combination set, a second table combination whose emergence frequency is greater than the preset value; and
deleting a redundant table combination from the second table combination to obtain the frequent table combination.

20. The non-transitory computer storage medium according to claim 19, wherein deleting the redundant table combination from the second table combination comprises:
when there are at least two table combinations that comprise same tables but different join keys, retaining a table combination that has a largest quantity of join keys;
when there are two table combinations that comprise a same join key, and a set that comprises tables in one table combination is a subset of a set that comprises tables in the other table combination, deleting a table combination that comprises fewer tables; and
when a same table is comprised in at least two table combinations, retaining the same table only in a table combination that has a highest emergence frequency among the at least two table combinations.

* * * * *

UNITED STATES PATENT AND TRADEMARK OFFICE
CERTIFICATE OF CORRECTION

PATENT NO.       : 11,030,196 B2
APPLICATION NO.  : 16/287510
DATED            : June 8, 2021
INVENTOR(S)      : Zhenhua Wang Page 1 of 1

It is certified that error appears in the above-identified patent and that said Letters Patent is hereby corrected as shown below:

In the Claims

Claim 8, Column 16, Line 1, "key" should read -- $key_j$ --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*